Patented July 7, 1936

2,046,356

UNITED STATES PATENT OFFICE 2,046,356

MANUFACTURE OF DIARYLAMINE DERIVATIVES

Max Wyler, Robert William Kersey, and Harold Smith, Blackley, England, assignors to Imperial Chemical Industries Limited, a corporation of Great Britain No Drawing. Application December 12, 1934, Serial No. 757,234. In Great Britain December 27, 1933

5 Claims. (Cl. 260—69)

The manufacture of 4-nitrosodiphenylamine by converting diphenylamine to its N-nitrosoamine derivative with nitrous acid, isolating this derivative and isomerizing it by treatment with ethyl alcoholic hydrochloric acid is known.

The present invention has for its object to provide an improved process for the manufacture of C-nitrosodiarylamines, from diarylamines adapted to give C-nitroso derivatives by treatment with nitrous acid and isomerization of the resulting nitrosamines, according to which the diarylamine is converted to the C-nitrosodiarylamine in one operation without isolation of any intermediate N-nitroso compound by treating it with nitrous acid in methyl alcoholic hydrochloric acid.

In this specification diaryl nitrosamine means a diarylamine in which the hydrogen atom attached to the nitrogen atom is replaced by the nitroso group; diarylamine means two aryl radicals joined by an NH group.

We accomplish the objects of our invention by carrying out the operation throughout under anhydrous conditions. As solvent for the diarylamine we employ an anhydrous alcohol, for instance methyl alcohol, to which the hydrochloric acid required is added as an alcoholic solution. The requisite alkali-metal nitrite is added in dry, powdered form.

Our novel process has the advantage that it produces the nitroso-compound directly in high yield without the necessity of isolating any intermediate nitrosamines. This effect is particularly advantageous and surprising in the case of diarylamines of the general formula R—NH—R', wherein R and R' are aromatic hydrocarbons of the benzene or naphthalene series. Hitherto it has been believed that the nitroso compounds of these diarylamines could not be produced except by producing first and isolating the intermediate nitrosamine. Diphenylamine, 2-methyl-diphenylamine, and phenyl-α-naphthylamine are typical examples.

Our process is also applicable to cases wherein the hitherto known aqueous process could be worked in one step, for instance to the case of 4-acetyl-diphenylamine which is employed in the manufacture of 4-amino-4'-acetylaminodiphenylamine.

In carrying the invention into practical effect, the nitrous acid required may be provided by sodium nitrite, preferably added in finely-divided form, this reacting with the methyl alcoholic hydrochloric acid. The strength of the methyl alcoholic hydrochloric acid may vary, but for best results should not be below 25%, and not over 40%. The required nitrosodiarylamine generally separates from the solution after formation, and with some nitrosodiarylamines it is convenient to add water for the purpose of complete separation.

The following examples in which parts are by weight illustrate but do not limit the invention.

Example I 169 parts of diphenylamine are dissolved in 80 parts of methyl alcohol at 60° C. and the solution run into 800 parts of methyl alcoholic hydrochloric acid (obtained by passing dry hydrogen chloride into methyl alcohol until the solution contains 40% of its weight of hydrogen chloride) with stirring, keeping the temperature below 30° C. After cooling the suspension to about 10° C., 80 parts of powdered sodium nitrite are added and the mixture stirred for a short time until 4-nitrosodiphenylamine formation is found to be complete as shown by the complete solubility of a test sample in dilute aqueous caustic soda. The mixture is diluted with twice its weight of water and the 4-nitrosodiphenylamine is filtered off. The yield is excellent.

4-nitrosodiphenylamine gives a practically quantitative yield of 4-aminodiphenylamine when reduced by known methods such as zinc and hydrochloric acid, sodium sulphide, glucose and caustic soda solution, and the like.

Example II 22 parts of phenyl-α-naphthylamine are pasted with 150 parts of methyl alcoholic hydrochloric acid (40% HCl). 9 parts of sodium nitrite are mixed into the paste allowing the temperature to rise to 45° C. After standing for one hour, yellow-green crystals of 4'-nitrosophenyl-α-naphthylamine are filtered off. A good yield is obtained.

Example III 23 parts of p-acetylaminodiphenylamine (prepared by acetylating 4-aminodiphenylamine) are dissolved in 350 parts of methyl alcoholic hydrochloric acid (40% HCl). 8 parts of sodium nitrite are stirred into the solution and the mixture stirred for 2–3 hours, at 25–30° C. with addition of a little further sodium nitrite, if a diluted sample does not show slight excess of nitrous acid on starch iodide paper. The mixture is cooled to 0° C. and the orange-yellow crystals of 4'-nitroso-4-acetylaminodiphenylamine which separate are filtered off.

This nitroso-derivative may be separated from alkali insoluble material by extracting with dilute caustic soda, filtering off insoluble matter, and re-precipitating the nitroso derivative from the filtrate by acidifying with acetic acid or by adding sodium bicarbonate.

*Example IV*

95 parts of 2-methyldiphenylamine are stirred with 1,000 parts of methyl alcoholic hydrochloric acid (40% HCl), and 40 parts of powdered sodium nitrite added. The mixture is stirred for two hours, diluted with water, neutralized with caustic soda and filtered from a little insoluble material. The 2-methylnitrosodiphenylamine is preciptated from the solution by adding sodium bicarbonate.

If the nitroso bodies are to be used for the manufacture of the corresponding amines by reduction, this reduction may be effected without isolating the nitroso compound from the aqueous caustic soda solution mentioned above.

It will be understood that the details of our preferred processes as above set forth may be varied within wide limits, without departing from the spirit of this invention.

We claim:

1. In the process of producing a p-nitrosodiarylamine by reacting upon a diarylamine with nitrous acid and then isomerizing the intermediately formed diaryl nitrosamine, the improvement which comprises effecting the nitrosation by the aid of an anhydrous alkali-metal nitrite in anhydrous alcoholic-hydrochloric acid medium.

2. In the process of producing a p-nitrosodiarylamine of the general formula (p) ON—R—NH—R', wherein R and R' are aryl hydrocarbon radicals of the benzene or naphthalene series, which process comprises reacting upon the corresponding diarylamine with nitrous acid and then isomerizing the intermediately formed diaryl nitrosamine, the improvement which comprises effecting the nitrosation by the aid of an anhydrous alkali-metal nitrite in anhydrous methyl-alcoholic-hydrochloric acid medium of between 25 and 40% strength based on the weight of the hydrochloric acid, whereby the nitrosation and isomerization proceed concurrently in the same medium.

3. The process of producing a p-nitroso-diarylamine of the general formula (p) ON—R—NH—R', wherein R and R' represent aromatic radicals of the benzene and naphthalene series, which comprises forming a solution of the corresponding diarylamine in anhydrous alcoholic hydrochloric acid, and adding an alkali-metal nitrite in dry form with stirring while keeping the reaction mass below room temperature, until a test sample is soluble in dilute aqueous caustic soda.

4. The process of producing a p-nitrosodiphenylamine which comprises dissolving the corresponding diphenylamine in a solution of hydrogen chloride in anhydrous methyl alcohol, containing between 25 and 40% by weight of hydrogen chloride, adding sodium nitrite powder and then diluting the reaction mass with water to precipitate the formed p-nitrosodiphenylamine.

5. In the process of producing p-nitrosodiphenylamine, the step which comprises reacting with anhydrous nitrous acid upon diphenylamine in an anhydrous alcoholic medium.

MAX WYLER.
ROBERT WILLIAM KERSEY.
HAROLD SMITH.